March 8, 1938. A. J. FISCHER 2,110,721
SEWAGE TREATMENT
Filed July 6, 1936   2 Sheets-Sheet 2
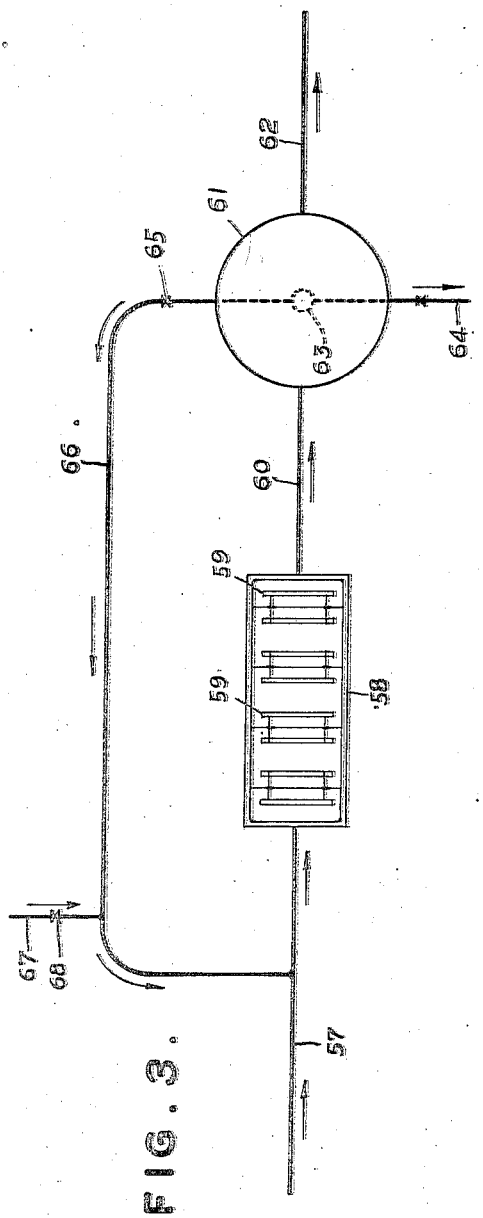
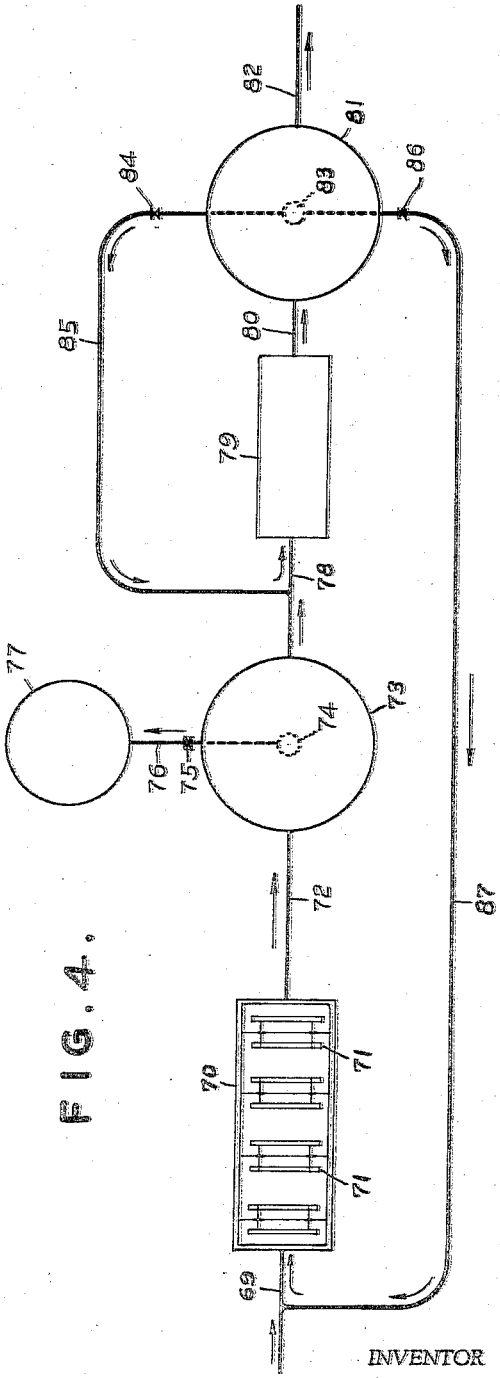
INVENTOR
ANTHONY J. FISCHER,
BY
ATTORNEY.

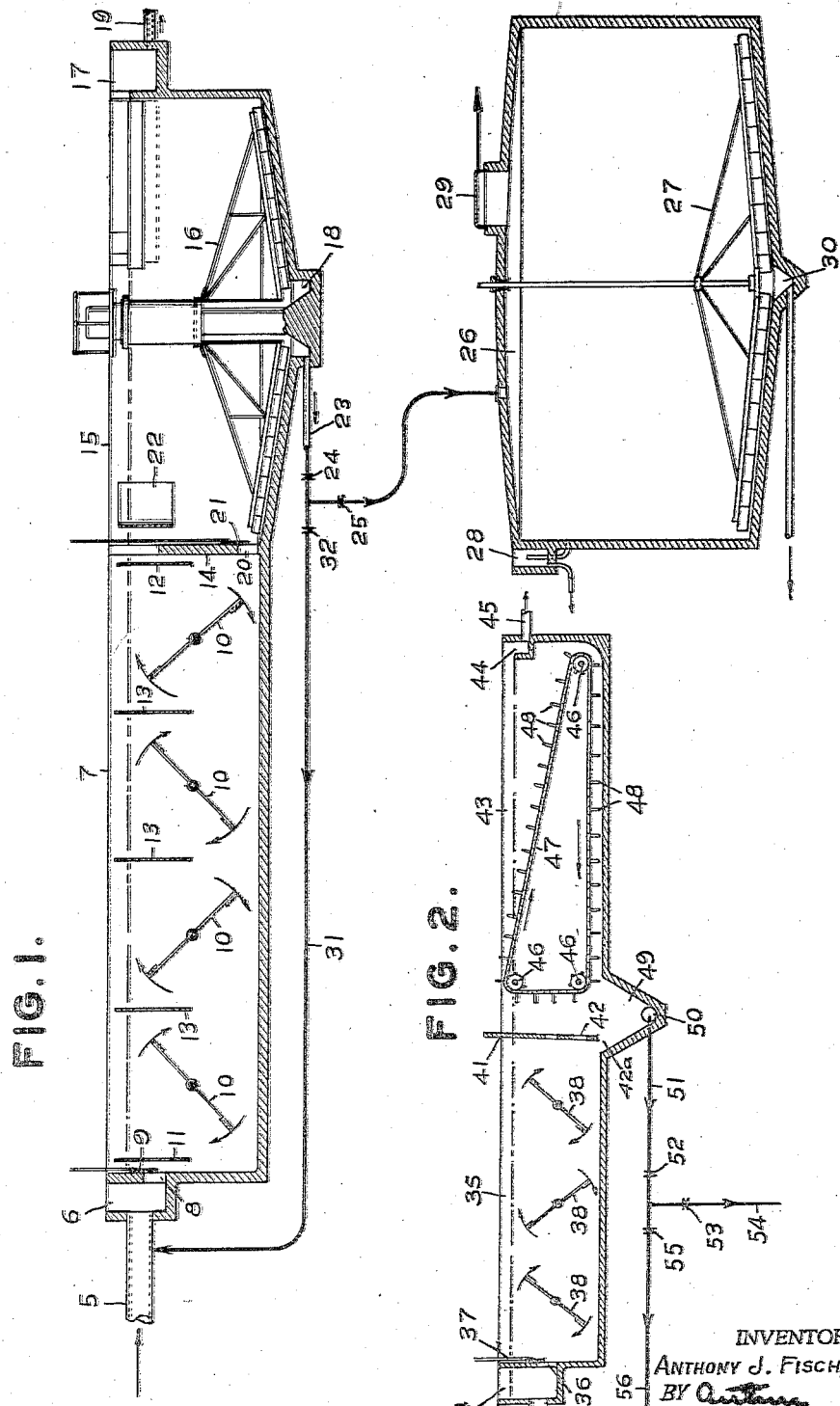

Patented Mar. 8, 1938

2,110,721

UNITED STATES PATENT OFFICE 2,110,721

SEWAGE TREATMENT

Anthony J. Fischer, Jackson Heights, N. Y., assignor to The Dorr Company, Inc., New York, N. Y., a corporation of Delaware Application July 6, 1936, Serial No. 89,007

1 Claim. (Cl. 210—2)

This invention relates to the clarification of sewage, trade wastes and other polluted waters for the removal therefrom of solids therein, by virtue of which there are obtained two products, namely, a relatively clear inoffensive effluent and a sludge of solids derived from the impure liquid being treated, which sludge is in a form capable of being digested as a result of bacteriological activity, or readily dewatered and disposed of in other preferred manner.

Sewage and analogous liquids normally contain solids of four types or phases; the first type comprising solids in suspension of sufficient size that they will settle out of the sewage by the action of gravity; the second type comprising solids in suspension, but which are non-settleable although they may be removed by filtration; the third type comprising solids that are colloidal in size or otherwise so small that they are non-settleable and non-filterable; and the fourth class comprising solids in solution in the liquid or solids which are in liquid phase.

One current manner of clarifying sewage is to run the sewage into and through a primary settler or clarifier, wherein the settleable suspended solids are acted upon by gravity and deposited in the form of sediment upon the floor of the settler, from which they are removed in the form of sludge ready for further disposal, such as by digestion. Effluent from the primary settler has therein solids which are normally non-settleable, colloidal solids, and solids in liquid phase. In order to make two types of these solids settleable, namely, the non-settleable suspended and the colloidal solids, the effluent from the primary settler is given one or the other of two general classes of treatment. One class is called the activated sludge process, and comprises passing the effluent through aeration tanks where, by the addition of air, there is stimulated aerobic bacterial activity, the result of which is to coagulate, solidify and render settleable two type of the solids in the settler effluent being thus treated. The activated liquid is passed from the aeration tanks to a second or secondary settler or clarifier, where the solids, rendered settleable by the aeration or activation step, are acted upon by gravity to deposit on the floor of the secondary settler in the form of activated sludge, which is suitable for further disposal, such as by means of digestion. The second general class of treatment is to substitute for the activated sludge process with its aeration tanks, a chemical-treatment step of adding to the effluent from the primary settler, chemical coagulants for initiating chemically the precipitating of the solids in the settler effluent into a form thereof capable of being settled in the secondary settler by gravity, into the form of sludge. Thus, in this process, chemical coagulation or chemical precipitation is substituted for the bacteriological coagulation of the activated sludge process.

The chemical treatment of sewage and other waste waters to precipitate non-settleable solids therein has been beset with many difficulties. It has long been known that a wide variety of chemical reagents, when introduced into a body of sewage, will produce or induce a precipitation and coagulation into the form of sludge of a large proportion of the solid matter contained in such liquids, which settles very rapidly and easily, so as to produce a relatively clear and innocuous supernatant. Since the first attempts at chemical precipitation and coagulation, however, the problem of disposal of the chemically-produced or -induced sludge has been one of considerable concern. Due to the inherent sticky and slimy nature of this chemically-produced sludge, the same is very difficult to dewater by any known means and consequently its disposal on filtering and drying beds is, at best, not highly satisfactory.

With growing popularity of methods of rendering sewage sludge relatively inert and inocuous by bacteriological digestion, attempts have been made to handle, by known digestion practices, chemically-produced sludge or sludge from polluted waters inherently or naturally containing some chemical matter which operates as an electrolyte. The difficulty was then encountered that chemical sludge or sludge settled out of sewage which had contained a chemical that acted as a precipitating reagent, will not digest or, at best, will digest only slowly and to a limited extent.

The older methods of treatment with chemical coagulants contemplated the incorporation of such chemical agents in a body of sewage and the subsequent settling of the sludge. As pointed out above, such sludge was found to be practically undigestible by bacteriological methods. This phenomenon is believed to be due to the fact that according to the older methods, a full utilization of the chemical agents was not had, and consequently it was not possible to obtain a sludge which did not have present an excess of unreacted chemical or reagent. The presence of such an unreacted chemical material hinders bacteriological activity and renders the sludge practically undigestible by known methods.

According to the earlier practices in chemical treatment, the chemical reagents were mixed with the raw sewage in order to produce a chemically-precipitated sludge. In the average raw sewage, using ferric chloride as a specific illustration, approximately 300 pounds of this reagent were required per million gallons of sewage in order to produce a sufficiently-clarified liquid. It is believed that approximately 100 pounds of the chemical are absorbed by the settleable solids and the remaining 200 pounds are required to effect precipitation and coagulation of the colloids and other non-settleable material. According to this practice it is therefore practically impossible to obtain a sludge which does not contain a considerable quantity of unreacted chemical, and this hinders or is inimical to digestion.

Considerable experimentation and investigation has been made in the field presented by this problem, resulting in various methods for its solution. One of the most successful of these is that wherein the raw sewage is first subjected to a primary sedimentation operation to obtain a sludge containing practically all of the settleable raw solids, which sludge, as pointed out above, is very easy to digest. The supernatant or sewage liquid from which raw solids have been settled, resulting from this preliminary treatment is then subjected to the action of chemical precipitating and coagulating agents, and thereafter subjected to a second sedimentation or clarification treatment from which a sludge is obtained containing the chemically-produced and coagulated solids. In comparison with earlier methods, this procedure requires approximately 200 pounds of ferric chloride to effect a suitable clarification. The raw sludge and the chemically-obtained sludge are then subjected to bacteriological digestion together in admixture, and it is found that such digestion will proceed readily and satisfactorily, any substantial excess of unreacted chemical being counteracted or neutralized by the raw sludge produced in the first sedimentation operation which has no absorbed chemicals.

The above and other methods of obtaining a digestible or otherwise readily disposable sludge have proven themselves satisfactory in many instances, and it is one object of the present invention to simplify these procedures and produce a sludge which may be digested according to known bacteriological methods, or otherwise readily disposed of, and to eliminate, in many instances, the necessity for the use of chemical reagents or activation by means of air.

As a result of considerable recent research, it has been discovered, as a part of the present invention, that the hereinafter described mechanical flocculation will increase clarification of the sewage to a marked degree. Therefore, one of the features of prime importance herein is to subject sewage, either raw or which has been effected a sedimentation operation to remove normally settleable solids, to the mechanical flocculation treatment afforded by the steady gentle agitative influences hereinafter described. In this embodiment of the invention the sewage of either type, is allowed to flow relatively slowly through a flocculation chamber and therein subjected to the gentle agitative effects of travelling paddles or other suitable agitative means. The flow is then conducted to a settling apparatus wherein, after a suitable period of detention, a considerable quantity of sludge is found to have settled out of the liquid. If raw sewage were being treated this quantity is found to be considerably larger than it would be if the mechanical floc conditioning were omitted. It is thus indicated that floc conditioning, as practiced in this invention, exhibits marked benefits in improving the clarification of polluted liquids by rendering settleable, solids which are not normally settleable and which have heretofore required the presence of added chemical reagents or activation to render them so. It is understood that the sludge derived from the mechanically flocculated sewage may be treated or disposed of in any desired manner, since this form of the invention contemplates only the improved clarification of polluted liquids by enabling the removal therefrom of a larger amount of solid matter as a result of the floc-conditioning treatment.

One possible explanation of the reasons for the improved results and efficiency of clarification afforded by mechanical flocculation, is that most sewage liquids and other waste waters are believed to contain, inherently and naturally, matter in the form of soluble salts and proteins or albuminous matter, which, in conjunction with gentle agitation, will materially assist in the efficient clarification of the liquid.

It is therefore an object of this invention to devise a method and a system of apparatus and treatment, whereby there may be produced from sewage or other polluted waters, a sludge which is readily and satisfactorily digestible or otherwise easily disposable.

Another object is to render settleable, by mechanical flocculating means, colloidal solids and normally non-settleable solids of the sewage, whereby the necessity of adding chemicals is eliminated, with the dual view of eliminating the cost of chemicals used and of increasing the clarification of sewage and analogous liquids.

Another object is to devise an apparatus for carrying out the practice of this invention on a flowing stream of liquid to be treated in a manner whereby the liquid flows in a straight line and directly from one to the other of the treating stages under conditions that the stages can be located closely succeeding one another, preferably in the same general tank or basin.

With these and other objects in view, one embodiment of the invention revolves about a sequence of functions and an assembly of apparatus for treating a flowing stream of liquid including as a feature of prime importance, a zone of slow and gentle agitative motion or flocculation.

In this flocculation zone by slow gentle motion, the colloidal solids and other solids in suspension, however small they may be, are brought together by mild forms of collision, whereupon, when they collide, they coalesce or colonize or amass into groups of particles of larger and settleable size. From the sewer main or other source, the liquid with solids in suspension, is fed to the flocculation zone wherein there is operated a series of paddles or other suitable agitative devices under conditions for causing the maximum number of collisions between the solids in suspension for conditioning or building them up into flocs of settleable size. This flocculated liquid drifts to a sedimentation zone under conditions of quiescent flow, in which the enlarged flocs are not torn apart or disintegrated. When the flocculated liquid reaches the sedimentation zone, it is subjected to the action of gravity, while the liquid is held in quiescence by virtue of which the settleable flocs and other matter in suspension in the liquid settle to, or deposit upon, the floor of the sedimentation apparatus as sediment, from which it is impelled to discharge by travelling rakes, which sweep over the floor of the sedimentation zone or settler, plowing the sediment slowly to discharge. From this settler the sediment or sludge is conducted to a digester for biologically treating the sludge and rendering it inert.

In the event that this invention is to be put into practice in a small sewage plant, it is not essential to use the primary settler for preliminarily removing from the sewage settleable solids normally therein, because the flocculation and final sedimentation steps of this invention can be carried out either in the presence of or in the absence of settleable solids normally in raw sewage. If anything, their presence helps, but in larger plants there is such a volume thereof that it would require the flocculation and sedimentation stages of this invention to be built to a size otherwise unnecessary.

With the above and other objects in view, the invention, its application and mode of use, may be readily understood from the following description of specific applications with reference to the accompanying drawings, which illustrate systems of apparatus and flow sheets for practicing the invention according to some of its preferred forms.

In the drawings,

Figure 1 is a vertical section of an assembly of apparatus which may be used as a complete treatment plant in carrying out the invention according to one of its forms.

Fig. 2 is a vertical section, on a smaller scale than Fig. 1, showing a modified form of apparatus for accomplishing the flocculation and sedimentation operations of the present invention.

Fig. 3 is a flow sheet diagrammatically illustrating a general lay-out of apparatus for carrying out features of the invention.

Fig. 4 is a flow sheet showing ways of carrying out other forms of the invention, with particular reference to its use in an activated sludge plant.

Referring in detail to Fig. 1 of the drawings, sewage or other polluted water to be treated is introduced through the sewer main 5 or other appropriate source into a feed launder or trough 6 which extends substantially across the end of a baffled tank or chamber 7. The launder 6 is in communication with the chamber 7 through ports or openings 8 through which the sewage passes from the launder into the chamber 7, there being provided adjustable gates 9 for controlling the flow therethrough. Rotatably mounted within the chamber 7 and driven from a suitable source of power are the paddles or bladed stirrers 10, which, when in operation are caused to rotate relatively slowly, preferably in a direction indicated by the arrows. There is thus exerted upon the liquid, and contained solids, a gentle agitative influence as the material traverses the chamber 7 from one end to the other thereof. The action of this slow, gentle agitative force is to gently bring the solid nuclei, colloidal solids and other solids together, causing them to impinge upon or collide with one another and to build up and grow into relatively large flocs having sufficient size and weight to settle out of the liquid in a subsequent sedimentation treatment. The normally non-settleable floc nuclei will build up not only upon themselves to form unitary settleable flocs, but will also build up upon the settleable solids which are present in the liquid. Returned sedimented sludge may be present to assist in this action as will be hereinafter described. It will thus be seen that the largest possible amount of solid material will be agglomerated so that the whole can be satisfactorily separated from the liquid portion in a subsequent operation. The chamber or unit 7, therefore, may be referred to or described as a floc growing or conditioning unit or zone, wherein coagmentation of normally non-settleable solids takes place.

The chamber 7 is preferably provided with baffles 11 and 12 adjacent the inlet and outlet ends respectively and with the intermediate baffles 13 between adjacent paddles or stirrers 10. These baffles extend above the maximum liquid level of the chamber 7 and terminate short of the bottom thereof and prevent short-circuiting of the liquid when entering and leaving the chamber, and also in the zones operated upon by the paddles.

The liquid containing most of its original solids of all types in highly agglomerated and easily settleable form is now allowed to pass out of or drift from the floc-conditioning zone 7, over or past the submerged baffle 14 and into a sedimentation unit 15 such as is afforded by a Dorr clarifier or other settler, provided with the sludge-raking mechanism 16, overflow launder 17 and sludge sump 18. In the clarifier 15 the agglomerated solids will settle by the action of gravity and deposit upon the settler floor leaving the relatively clear and innocuous supernatant liquid to pass off via the launder 17 and pipe 19. The submerged baffle 14 preferably terminates short of the bottom of chamber 7 affording a passageway 20 for permitting some of the sludge or flocculated material to drift or be sucked back into the flocculation zone 7 from the clarifier 15 for the purpose of maintaining in the flocculation zone a supply of formed flocs upon which non-settleable solids may deposit and build up. An adjustable gate 21 is provided for varying the size of the opening 20 or for closing the same entirely should such practice be desired.

The clarifier 15 may be provided with a baffle 22 adjacent the place of admission of the flocculated liquid from chamber 7 for the purpose of deflecting this liquid downward, enhancing sedimentation and assisting the return of flocs through the passageway 20. The sludge which settles or deposits in the clarifier 15 is continually or intermittently withdrawn from the sump 18 and conducted via the path 23 and valves 24 and 25 to a sludge digester 26 provided with the sludge-raking mechanism 27, supernatant overflow 28, gas vent 29 and digested-sludge outlet 30. An alternate flow path 31 and valve 32 are shown, whereby, if desired, a quantity of the sludge from the sedimentation zone 15 may be recirculated and returned to the sewage entering the system for providing additional seeding nuclei as the foundation on which to build up flocs.

Fig. 2 shows a modified form of apparatus for practicing the flocculation and sedimentation operations of the present invention in a manner substantially the same as that described in connection with Fig. 1. In this modification there is provided a pipe 33 by which sewage or other polluted liquid is delivered to the feed launder or trough 34 extending substantially across the end of chamber or tank 35 and in communication therewith through the opening or openings 36, the size of which is variable by manipulation of the adjustable gate 37. This chamber 35 is provided with the revoluble paddles or stirrers 38 and forms the flocculation unit or zone of the present modification. Liquid flowing through the chamber 35 is acted upon by the paddles 38 in a manner substantially the same as in the apparatus of Fig. 1. The outlet end of the chamber 35 is defined by a wall or partition 41 which extends above the maximum liquid level of the chamber. The wall 41 is provided preferably at a lower portion thereof with a plurality of ports or openings 42 through which the liquid, after having been acted upon by the paddles 38, passes into a sedimentation zone, unit or tank 43 shown in the present modification to be substantially rectangular in shape and provided with the supernatant overflow launder 44 and effluent outlet pipe 45. Mounted within the tank 43 are the sprockets 46 which carry the endless chain 47, the chain being provided with a plurality of blades or scraping elements 48. The sprockets 46 are caused to rotate by the application of suitable power and thus cause the chain 47 and attached scrapers 48 to travel along a path and in the direction indicated by the arrows. Flocculated liquid flowing into the tank 43 through the openings 42 will be held in a relatively quiescent condition within the tank and the flocculated solid matter will settle to the bottom or floor of the tank 43 and deposit thereon in the form of sludge which sludge is substantially continuously raked or scraped by the blades 48 into the sludge sump 49 from whence it may be continually or intermittently discharged through the outlet 50 and conducted via the path 51, valves 52 and 53 and path 54 to a digester, filter or other suitable point of disposal. As described in connection with Fig. 1 there is also provided a valve 55 and path 56 for returning a quantity of the sedimented sludge to the incoming sewage to be treated. The wall or partition 41 preferably is offset somewhat from the end of the substantially horizontal bottom of the chamber 35 and spaced therefrom as indicated at 42a to provide a passageway through which flocculated material or settled sludge may drift or be sucked back into the chamber 35 to assist in maintaining a supply of seed or floc nuclei in the flocculation zone.

The flow sheet of Fig. 3 shows clearly a method of practicing features of the present invention in which may be used the apparatus shown in Fig. 1 or 2, or any other suitable apparatus that is effective in operating the necessary steps. In practicing the treatment method outlined in Fig. 3, sewage, either raw or preclarified, flowing on the path 57, enters the tank or chamber 58 provided with the paddles or other suitable agitative means 59. The paddles 59 are caused to rotate in suitable manner and exert upon the sewage flowing slowly through the chamber 58 the gentle agitation described above. As a result thereof, it is found that growth of settleable flocs is materially promoted and that large quantities of the colloidal constituents of the sewage are brought into intimate contact one with the other and with settleable solids or already formed flocs, thus effecting the formation of a settleable flocculated material which, while somewhat more delicate than chemical-conditioned flocs, is quite stable if handled properly and readily settles in the subsequent sedimentation operation.

Leaving the flocculation zone 58 the mechanically flocculated sewage passes along the path 60 and into the sedimentation zone or clarifier 61 in which a sedimentation or settling operation is carried out, the clarified effluent passing off to suitable disposal via the path 62. Settleable solid matter in the sewage, including the mechanically-conditioned flocs and other solids, deposits on the bottom of the clarifier and is removed through the sludge discharge outlet 63, waste sludge being conducted off along the path 64 to a digester, filter or other suitable means of disposal.

The flow-path 60 preferably should be of such construction as to effect as little as possible acceleration in the rate of flow of the flocculated liquid and to allow a relatively quiet and non-turbulent flow thereof so as to avoid or minimize the break-up or destruction of flocculated material.

In practicing this feature of the invention in the above described manner it is frequently desirable and efficacious to introduce or return to the flocculation zone a quantity of sludge from the clarifier. Should such mode of operation be indicated sludge from the clarifier 61 may be conducted through the valve 65 and path 66 and returned to the chamber 58, preferably by being introduced to the sewage flowing to the chamber along the path 57 as shown in the drawings. The return of this sludge provides convenient centers or nuclei upon which colloids and other normally non-settleable solids may impinge, deposit and adhere in the course of the gentle agitative treatment, thus materially adding to, furthering and assisting the formation and growth of a maximum of flocs. When sludge is returned to the chamber 58 as just described, it is generally advisable to take some precaution to prevent the sludge from becoming septic. This may be accomplished conveniently by injecting into the returned sludge, as via the path 67 and valve 68, chlorine or other antiseptic substance.

The invention is, of course, not necessarily limited to the non-chemical flocculation of either raw or settled sewage but may be practiced effectively on either type. In large plants, particularly, where there generally are primary and secondary sedimentation steps, the non-chemical flocculation treatments described herein may be applied to the raw sewage flowing to the primary sedimentation stage and also to the effluent therefrom on its way to the secondary sedimentation stage.

As an indication of the general efficiency of the type of treatment just described, numerous tests on both laboratory and commercial scales, have conclusively shown the invention to afford advantages and savings over prior practices in sewage treatment not heretofore deemed possible. The schedule set forth below is clearly indicative of the results obtainable. The operations were carried out for a period of ten days in an actual sewage disposal plant. There were used two clarifiers of identical size and construction and the inflow of raw sewage was split, part going directly to one clarifier and part going first through a flocculation chamber similar to that described herein and thence to the other clarifier. The flocculation-sedimentation treatment was effected in the manner hereinbefore described and there was no return of sludge.

The following results were obtained on a large plant scale where a flocculation-sedimentation combination was compared with a parallel arrangement of sedimentation without flocculation:

| Days | Raw sewage suspended solids P.P.M. | With flocculation | | | | | Without flocculation | | | |
|---|---|---|---|---|---|---|---|---|---|---|
| | | Flow G.P.M. | Flocculation period hours | Settling period hours | pH value | Effluent suspended solids P.P.M. | Flow G.P.M. | Settling period hours | pH value | Effluent suspended solids P.P.M. |
| 1 | 240 | 920 | 0.51 | 1.87 | 7.0 | 121 | 910 | 1.89 | 7.0 | 135 |
| 2 | 259 | 920 | 0.51 | 1.87 | 7.0 | 111 | 910 | 1.89 | 7.0 | 136 |
| 3 | 274 | 920 | 0.51 | 1.87 | 6.9 | 108 | 910 | 1.89 | 6.9 | 140 |
| 4 | 219 | 920 | 0.67 | 1.87 | 6.9 | 110 | 910 | 1.89 | 6.9 | 144 |
| 5 | 232 | 920 | 0.67 | 1.87 | 6.9 | 90 | 910 | 1.89 | 6.9 | 119 |
| 6 | 172 | 920 | 0.67 | 1.87 | 7.0 | 89 | 910 | 1.89 | 7.0 | 116 |
| 7 | 365 | 1,216 | 0.51 | 1.42 | 7.0 | 130 | 594 | 2.90 | 7.0 | 146 |
| 8 | 315 | 1,216 | 0.51 | 1.42 | | 119 | 594 | 2.90 | | 136 |
| 9 | 277 | 1,216 | 0.51 | 1.42 | | 110 | 594 | 2.90 | | 129 |
| 10 | 283 | 1,216 | 0.51 | 1.42 | | 123 | 594 | 2.90 | | 133 |

These results confirm earlier laboratory tests and show that even with twice the flow going through the flocculation-sedimentation units better results are obtained than where only sedimentation is employed. This shows that a saving in total tank capacity may be made using flocculation so that a net savings in plant cost will be effected. pH value tests show that there is no change in acidity or alkalinity of the sewage caused by flocculation. The effect is, therefore, different than where such chemicals as lime, ferric salts, etc. are used in ordinary chemical precipitation practice. Tests have also demonstrated that the flocs produced by this plain mechanical flocculation are rather delicate—more so than chemically precipitated flocs. This requires careful handling of the material so as to prevent floc break-up. It appears that a velocity of over 1.5 ft./sec. will cause some flocs to break with this type of treatment, as against 2.0 to 2.5 ft./sec. for a true chemical floc such as produced by the addition of ferric chloride.

A number of other tests show similar and, in some instances, even better results in the same type of treatment. In general, the most satisfactory flocculation period seems to be about twenty minutes, which, of course, will vary according to the character of the sewage. The sewages tested varied widely in strength from 89 P.P.M. to 1670 P.P.M. suspended solids. The extremely strong sewages were due to storm flows where street washings, etc. were carried down to the plant either because of combined sewer systems or because of infiltration.

The increase in removal of solids effected by flocculation in storm flow sewages was not as great as that in sewages where there had been no storm flow. A reason for this is that it is believed that the beneficial effects of mechanical floc conditioning are due, in part at least, to the presence in the sewage of soluble salts and the effect of these salts, such as sodium chloride, ammonium salts, etc., in salting out protein constituents of the sewage and in converting "sol" forms of colloids to the "gel" form. In the storm flow sewages the protein content was relatively low, hence the lesser effect of flocculation. At a plant near the ocean the effects of flocculation were observed to be greatest. This is believed due to the fact that this sewage had a high sodium chloride content because of salt water infiltration. This high salt content seemed to favor flocculation. In general, it appears that the results are better when the suspended solids in the raw sewage increase, provided the solids are of domestic sewage origin (i. e., not from street washings or other source where the mineral content is high and the protein content low).

It is possible that sewages may be encountered which contain sufficient protein or albuminous matter to respond satisfactorily to the non-chemical flocculation of the present invention, but are deficient in soluble salt constituents so that the maximum benefits of the floc-conditioning treatment are not realized. In these and other instances it may be desirable to add sea water, when available, to the sewage before the floc-conditioning treatment, or to incorporate into the sewage the desired quantity of soluble salt material in the form of sodium chloride, ammonium salts or the like.

The flow sheet of Fig. 4 shows a modification of the invention as applied to an activated sludge treatment plant. In this form sewage flows through the path or main 69 and enters the flocculation chamber 70, which is provided with the agitative means 71 as hereinbefore described, wherein it is subjected to the previously described gentle agitative influence. A certain concentration of returned activated sludge is maintained in the sewage in chamber 70 as will be hereinafter described.

The flocculated sewage flows from the chamber 70 along the path 72 in a relatively quiet manner, to the primary sedimentation zone or clarifier 73 wherein settleable solids deposit on the bottom of the clarifier and are removed through sludge discharge outlet 74 and conveyed via valve 75 and path 76 to a digester 77 or to other suitable means of disposal. The effluent from clarifier 73 is conducted along the path 78 to an aeration tank 79 wherein it is subjected to the infusion of air according to common activated sludge practice. The aerated sewage flows from tank 79 along path 80 to the secondary sedimentation zone or clarifier 81 from which clarified effluent passes via path 82. A certain amount of sludge from clarifier 81 is recirculated from sludge discharge outlet 83 through valve 84 and path 85 to the aeration tank 79, as is usual in activated sludge practice, in order to maintain the necessary concentration of activated sludge in the contents of the aeration tank.

What is known in the art as "waste activated sludge", or a quantity thereof, is withdrawn from the discharge outlet 83 and recirculated via the valve 86 and path 87 to the flocculation chamber 70 as shown in the drawings. Thus there is maintained in the sewage undergoing treatment in chamber 70 a supply of activated sludge which exhibits marked benefits in aiding and assisting floc formation and growth. Activated sludge is quite stable and of a fluffy and sticky nature. Its presence, therefore, affords a highly receptive base and non-settleable solid matter will deposit upon and readily adhere to the floc nuclei provided thereby.

In any procedure under the present invention, the preferred form of disposal of the sludge is bacterial digestion. The invention is not to be understood, however, as being limited necessarily to that aspect. Due to the production of a sludge having present therein a minimum of unreacted chemical, filtering or other disposal thereof is also an efficient means of sludge disposition and methods other than digestion may be used to advantage in certain instances.

While herein the invention has been shown and described in its application to the treatment of sewage, it is to be understood that its use is not limited to that specific aspect, but is equally applicable in the treatment of analogous liquids such as trade wastes, packing house wastes, creamery wastes and other polluted liquids. Whenever in the claim the word sewage is used, such term is intended to cover other analogous liquids including those enumerated above.

I claim:

The method of treating sewage and other organically polluted liquids which comprises continually passing liquid having normally therein protein impurities and a soluble salt through a flocculation zone at a velocity not in excess of substantially 1.5 feet per second so that the flocs once formed therein will not be materially disintegrated, wherein the liquid is treated to mechanically-produced gentle agitative effects conducive to the colliding of suspended solids and the amassment thereof into settleable flocs, and wherein without the addition of a chemical coagulant to the liquid there is also effected interaction between the protein substances and soluble salt of the liquid for yielding therefrom flocculatable suspended solids without substantial change during the treatment period of the pH value of the liquid, drifting the floc-laden liquid to a sedimentation zone, and separately removing therefrom sediment and clarified effluent.

ANTHONY J. FISCHER.